(12) United States Patent
Wang et al.

(10) Patent No.: US 11,783,445 B2
(45) Date of Patent: Oct. 10, 2023

(54) IMAGE PROCESSING METHOD, DEVICE AND APPARATUS, IMAGE FITTING METHOD AND DEVICE, DISPLAY METHOD AND APPARATUS, AND COMPUTER READABLE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuefeng Wang, Beijing (CN); Yukun Sun, Beijing (CN); Hao Zhang, Beijing (CN); Lili Chen, Beijing (CN); Jinghua Miao, Beijing (CN); Bin Zhao, Beijing (CN); Xi Li, Beijing (CN); Lixin Wang, Beijing (CN); Jianwen Suo, Beijing (CN); Wenyu Li, Beijing (CN); Jinbao Peng, Beijing (CN); Qingwen Fan, Beijing (CN); Yuanjie Lu, Beijing (CN); Yali Liu, Beijing (CN); Chenru Wang, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 200 days.

(21) Appl. No.: 16/641,537

(22) PCT Filed: Mar. 13, 2019

(86) PCT No.: PCT/CN2019/078015
§ 371 (c)(1),
(2) Date: Feb. 24, 2020

(87) PCT Pub. No.: WO2019/196589
PCT Pub. Date: Oct. 17, 2019

(65) Prior Publication Data
US 2021/0158481 A1 May 27, 2021

(30) Foreign Application Priority Data
Apr. 11, 2018 (CN) .................. 201810321434.X

(51) Int. Cl.
*G06T 3/40* (2006.01)
*G06F 3/04845* (2022.01)
*G06T 11/60* (2006.01)

(52) U.S. Cl.
CPC ........ *G06T 3/4038* (2013.01); *G06F 3/04845* (2013.01); *G06T 11/60* (2013.01)

(58) Field of Classification Search
CPC .... G06T 3/00; G06T 3/60; G06T 3/4038; G06T 11/60; G06T 7/11; G06T 3/0012;
(Continued)

(56) References Cited

U.S. PATENT DOCUMENTS 10,425,622 B2 * 9/2019 Brudnak ............... G06T 3/0012
10,867,368 B1 * 12/2020 Sharma ................. G06T 3/0025
(Continued)

FOREIGN PATENT DOCUMENTS

| CN | 1980330 A | 6/2007 |
| CN | 102957842 A | 3/2013 |
(Continued)

OTHER PUBLICATIONS

Second Chinese Office Action in Chinese Application No. 201810321434.X, dated Aug. 4, 2020 with English translation.
(Continued)

*Primary Examiner* — Chante E Harrison
(74) *Attorney, Agent, or Firm* — Collard & Roe, P.C.

(57) ABSTRACT

An image processing method is provided, the method includes: performing area division on an input image to obtain a plurality of sub-images; determining a part of the plurality of sub-images as an image to be output; stitching
(Continued)

respective sub-images of the image to be output to obtain a stitched image; and transmitting the stitched image, wherein the stitched image is smaller than the input image. An image jointing method is provided, the method includes: receiving a stitched image obtained by the image processing method according to the present disclosure; extracting respective sub-images of an image to be output from the stitched image; and jointing the respective sub-images to obtain a display image, wherein the jointing the respective sub-images refers to obtaining the display image by an operation inverse to a stitching process of stitching the respective sub-images to obtain the stitched image.

13 Claims, 9 Drawing Sheets

(58) Field of Classification Search
CPC ...... G06F 3/04845; H04N 5/14; H04N 5/262; H04N 5/265; H04N 5/2628; H04N 13/161; H04N 13/194; H04N 13/275; H04N 13/363; H04N 21/00; H04N 19/597

See application file for complete search history.

(56) References Cited

U.S. PATENT DOCUMENTS

| | | | |
|---|---|---|---|
| 2007/0133900 A1 | 6/2007 | Nielsen et al. | |
| 2013/0100132 A1* | 4/2013 | Katayama | H04N 13/275 345/420 |
| 2013/0155069 A1* | 6/2013 | Borders | G06F 3/0481 345/441 |
| 2016/0125629 A1* | 5/2016 | Shah | G06T 11/20 345/627 |
| 2016/0247256 A1* | 8/2016 | Gupta | G06Q 50/01 |
| 2017/0127031 A1* | 5/2017 | Mori | G06T 3/0093 |
| 2017/0249719 A1* | 8/2017 | Kansara | G06T 3/0012 |
| 2018/0152636 A1* | 5/2018 | Yim | H04N 5/23216 |
| 2018/0184000 A1* | 6/2018 | Lee | G06F 3/0484 |
| 2018/0184001 A1* | 6/2018 | Yoshida | H04N 1/00 |
| 2018/0357804 A1* | 12/2018 | Forutanpour | H04N 17/002 |
| 2019/0199995 A1* | 6/2019 | Yip | G06T 3/60 |
| 2020/0125244 A1* | 4/2020 | Feinstein | G06F 3/04883 |
| 2020/0257436 A1* | 8/2020 | Yun | G06F 3/04883 |

FOREIGN PATENT DOCUMENTS

| | | | | |
|---|---|---|---|---|
| CN | 103312916 A | 9/2013 | | |
| CN | 103581603 A | 2/2014 | | |
| CN | 107317987 A | 11/2017 | | |
| CN | 107516294 A | 12/2017 | | |
| CN | 113378634 A | * 9/2021 | ............ | G06F 16/51 |
| JP | 2008-098870 A | 4/2008 | | |
| WO | WO-2018048223 A1 | * 3/2018 | ............ | G06T 3/60 |

OTHER PUBLICATIONS

International Search Report of PCT/CN2019/078015 in Chinese, dated May 22, 2019, with English translation.

* cited by examiner

IMAGE PROCESSING METHOD, DEVICE AND APPARATUS, IMAGE FITTING METHOD AND DEVICE, DISPLAY METHOD AND APPARATUS, AND COMPUTER READABLE MEDIUM

CROSS-REFERENCE TO RELATED APPLICATIONS

This application is the National Stage of PCT/CN2019/078015 filed on Mar. 13, 2019, which claims priority under 35 U.S.C. § 119 of Chinese Application No. 201810321434.X filed on Apr. 11, 2018, the disclosure of which is incorporated by reference.

TECHNICAL FIELD

The present disclosure relates to a field of image processing, and more particularly, to an image processing method, an apparatus, an image jointing method, a display apparatus, and a medium.

BACKGROUND

Recently, high-definition displays have been widely used, and visual experience of viewers keeps improving as resolution of images becomes higher and higher. However, on the other hand, high-resolution images have high requirements on processing speed of processors, and more bandwidth resources need to be occupied during a transmission process.

For human eyes, due to different concentration of cone cells on the retinas responsible for observing color and details, human eyes can only accept details in the center of a viewing area, which corresponds to a viewing area with an angle of 5 degrees of human eyes relative to images observed, and for anything beyond the range of the viewing area, human eyes will blur clarity of these things. It can be seen that an effective observation area of human eyes is approximately circular. That is, for an image (particularly, a high-resolution image), only the image in the central circular area is the image effectively captured by human eyes ultimately, while the image in the edge area outside the circular area does not fall within the effective observing area of human eyes.

However, output of current image processors can only be rectangular images, and images transmitted in a channel can only be rectangular images. This makes it still necessary in the prior art to ensure transmission of rectangular images in a channel Among the transmitted rectangular images, only an image in the central circular area is the image effectively observed (also referred to as an effective image part) in terms of users' effective viewing experience, while an image in the edge area outside the circular area is the image that has not been effectively observed (also referred to as an useless image part). Therefore, a part of images (i.e., images in the edge area) of the rectangular images transmitted in the channel waste channel bandwidth to a certain extent.

SUMMARY OF THE INVENTION

According to an aspect of the present disclosure, there is provided an image processing method, comprising: performing area division on an input image to obtain a plurality of sub-images; determining a part of the plurality of sub-images as an image to be output; stitching respective sub-images of the image to be output to obtain a stitched image; and transmitting the stitched image, wherein the stitched image is smaller than the input image.

According to an embodiment of the present disclosure, wherein the stitched image is a rectangular image.

According to an embodiment of the present disclosure, wherein the stitched image is a non-rectangular image, and the method further comprises: filling vacant areas of the stitched image to form a rectangular image.

According to an embodiment of the present disclosure, wherein the stitching respective sub-images of the image to be output comprises: determining a sub-image with the largest area among the respective sub-images, and moving other sub-images among the respective sub-images relative to the sub-image with the largest area.

According to an embodiment of the present disclosure, wherein the plurality of sub-images are divided based on a shape of a display area of a display apparatus.

According to another aspect of the present disclosure, there is further provided an image jointing method, comprising: receiving a stitched image obtained by the image processing method mentioned above; extracting respective sub-images of an image to be output from the stitched image; and jointing the respective sub-images to obtain a display image, wherein the jointing the respective sub-images refers to obtaining the display image by an operation inverse to a stitching process of stitching the respective sub-images to obtain the stitched image.

According to an embodiment of the present disclosure, the image jointing method further comprising: calculating, for the respective sub-images of the image to be output, jointing parameters of the sub-images; jointing the respective sub-images based on the jointing parameters of the respective sub-images.

According to an embodiment of the present disclosure, wherein the jointing parameters include area ratio parameters and offset parameters, the area ratio parameters include width ratios and height ratios of the sub-images relative to a display area of a display apparatus, and the offset parameters include starting positions of the sub-images in the display area.

According to an embodiment of the present disclosure, wherein the jointing the respective sub-images comprises jointing according to a shape of the display area of the display apparatus.

According to another aspect of the present disclosure, there is further provided an image display method, comprising: performing area division on an input image to obtain a plurality of sub-images; determining a part of the plurality of sub-images as an image to be output; stitching respective sub-images of the image to be output to obtain a stitched image; transmitting the stitched image, wherein the stitched image is smaller than the input image; receiving the stitched image; extracting the respective sub-images of the image to be output from the stitched image; and jointing the respective sub-images, and displaying a display image obtained by the jointing, wherein the jointing the respective sub-images refers to obtaining the display image by an operation inverse to a stitching process of stitching the respective sub-images to obtain the stitched image.

According to another aspect of the present disclosure, there is further provided an image processing device, comprising: an area dividing unit configured to perform area division on an input image to obtain a plurality of sub-images; a stitching unit configured to determine a part of the plurality of sub-images as an image to be output; an outputting unit configured to stitch respective sub-images of the image to be output to obtain a stitched image and transmit the stitched image, wherein the stitched image is smaller than the input image.

According to another aspect of the present disclosure, there is further provided an image jointing device, comprising: a receiving unit configured to receive a stitched image obtained by the image processing method mentioned above; a jointing unit configured to extract respective sub-images of an image to be output from the stitched image, and joint the respective sub-images to obtain a display image, wherein the jointing the respective sub-images refers to obtaining the display image by an operation inverse to a stitching process of stitching the respective sub-images to obtain the stitched image.

According to another aspect of the present disclosure, there is further provided an image processing apparatus, comprising: one or more processors, and one or more memories, wherein the processors are configured to execute computer instructions to perform the image processing method mentioned above, or to perform the image jointing method mentioned above.

According to another aspect of the present disclosure, there is further provided a display apparatus comprising a display screen and at least one processor, wherein the at least one processor is configured to receive a stitched image obtained by the image processing method mentioned above; perform the image jointing method of mentioned above to obtain a display image, the display screen being configured to display the display image.

According to an embodiment of the present disclosure, the display apparatus further comprising one or more sensors configured to track and determine a user's viewing point data within a display area of the display apparatus, the at least one processor of the display apparatus being further configured to transmit the viewing point data to the image processing apparatus mentioned above.

According to an embodiment of the present disclosure, the at least one processor of the display apparatus being further configured to obtain a shape of the display area of the display apparatus, and transmit the shape to the image processing apparatus mentioned above.

According to an embodiment of the present disclosure, wherein the shape of the display area of the display apparatus includes a non-rectangular shape.

According to another aspect of the present disclosure, there is further provided a computer-readable storage medium configured to store computer instructions that, when executed by a processor, perform the image processing method mentioned above, or perform the image jointing method mentioned above.

BRIEF DESCRIPTION OF THE DRAWINGS

In order to illustrate technical solutions of embodiments of the present disclosure more clearly, accompanying drawings of the embodiments will be briefly introduced below. Obviously, the drawings in the following description only relate to some of the embodiments of the present disclosure, but not to limit the present disclosure.

DESCRIPTION OF THE EMBODIMENTS

Figure 1:
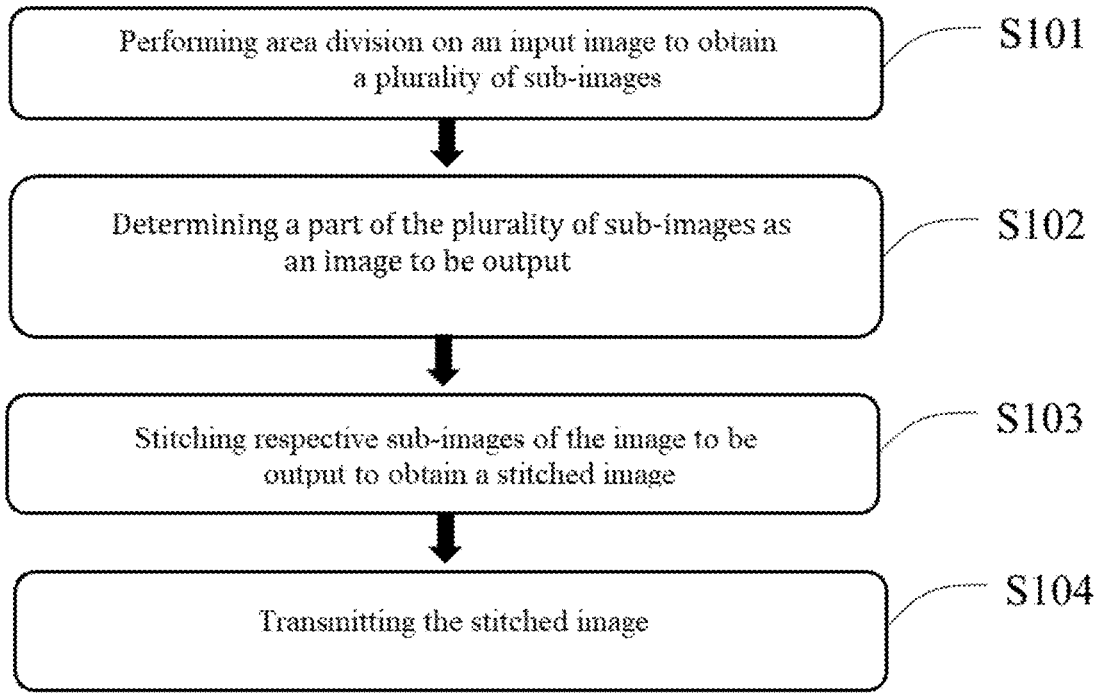
FIG. 1 shows a flowchart of an image processing method according to the embodiments of the present disclosure.

Various embodiments according to the present disclosure will be described in detail with reference to the accompanying drawings. Herein, it should be noted that, in the drawings, the same reference numerals are given to components having substantially the same or similar structure and function, and repeated descriptions thereof will be omitted.

In order to make objectives, technical solutions and advantages of the embodiments of the present disclosure clearer, the technical solutions of the embodiments of the present disclosure will be clearly and thoroughly described below, in conjunction with the accompanying drawings of the embodiments of the present disclosure. Obviously, the described embodiments are only a part but not all of the embodiments of the present disclosure. All other embodiments obtained by a person of ordinary skill in the art based on the described embodiments of the present disclosure without creative labor shall fall within the scope of the present disclosure.

Technical terms or scientific terms used herein are intended to have the ordinary meaning as understood by those of ordinary skill in the art to which the present disclosure belongs, unless otherwise defined. Words such as "first", "second" and the like used in the present disclosure do not denote any sequence, quantity or priority, but are used to distinguish different components. Likewise, words such as "include", "comprise" and the like mean that an element or an object before these words contain elements, objects or alternatives thereof listed thereinafter, without excluding other elements or objects. Words such as "connection", "connected" and the like are not restricted to physical or mechanical connections, but may include electrical connections, regardless of direct or indirect connections. "up", "down", "left", "right", etc. are only used to indicate relative positional relationships, and when absolute position of the described object changes, the relative positional relationships may also change accordingly.

In the embodiments of the present disclosure, a renderer is used to create, acquire, and perform image processing operations. The renderer may be, for example, a Unity renderer or other image processing tools, which is not limited in the present disclosure.

For example, a display area to be rendered by the renderer may be the entire scene targeted by the renderer performing rendering.

For example, construction of a scene (space, illumination, objects, and the like) may be performed by the renderer according to data (attributes, uniforms, texture, and the like) for constructing the scene.

For example, the renderer may perform construction of a scene by using a graphics processor's shader, or a central processing unit, or other logical operation circuits that can execute rendering operations by performing related operation instructions.

In the renderer, a plurality of virtual cameras, for example, orthogonal projection cameras and perspective projection cameras, are arranged and various parameters may be set to enable the respective virtual cameras to obtain desired images for providing a viewable scene view during the rendering process. Import mages taken by the virtual cameras into the renderer, set parameters of the virtual cameras and adjust angles of the virtual cameras, to capture an image to be processed as an input image.

In the renderer, required algorithms may be designed to meet the purpose of performing required image processing. These algorithms may be implemented in a form of software products running on a processor executing the renderer, or may be solidified in hardware circuits performing the required image processing. Whether it is implemented by hardware or software, the process of performing the required image processing may be abstracted into a model that performs a corresponding image processing function, for example, dividing images may be referred to as a division model, stitching images may be referred to as a stitching model, and jointing images may be referred to as a jointing model, and so on.

According to the inventor's knowledge, due to the physiological structure of human eyes, concentration of cone cells on the retinas of human eyes responsible for observing color and details is different. Usually, human eyes can only accept details in the viewing area when observing an image, and for a display area beyond the range of the viewing area of human eyes, sharpness will gradually decrease because of a blurring process due to the limitation of distribution of the cone cells in human eyes that produce visual perception. Therefore, in a display image, the image in the central area (which may be the central area of the entire image, or the central area of a local image area where human eyes are observing) focused on by human eyes is the area that may be effectively focused on by human eyes ultimately, while the image that is not effectively focused on by human eyes, that is, the image outside the central area may be referred to as useless image part.

Therefore, in order to minimize channel bandwidth occupied by transmission of useless images (i.e., edge images), the embodiments of the present disclosure provide an image processing method. FIG. 1 shows a flowchart of the image processing method.

In step S101, area division is performed on an input image to obtain a plurality of sub-images. According to an embodiment of the present disclosure, the division of the sub-images may be based on a shape of a display area of a display apparatus. According to another embodiment of the present disclosure, the sub-images may also be divided based on acquired viewing point data of a user in the display area.

Next, in step S102, a part of the plurality of sub-images are determined as an image to be output. Sub-images that are not determined as the image to be output will be discarded as discarded images, that is, only the sub-images of the image to be output need to be transmitted, while the discarded images do no need to be transmitted.

Next, in step S103, the respective sub-images of the image to be output are stitched to obtain a stitched image.

Generally, since the central area of an image that human eyes focus on is approximately a circular shape, and images transmitted in a channel are generally of a rectangular shape, it is necessary to perform a rectangularization process on the approximately circular image area to facilitate transmission. Considering that the edge of the circular image is curved, a rectangular image cannot be easily formed only by moving relative positions and angular deflections of respective sub-images of the circular image. Therefore, in one embodiment of the present disclosure, the shape of the image to be output may be a non-rectangular shape such as a hexagon, an octagon, etc. These non-rectangular images are more similar to a circular shape than the rectangular image to be output. Display of such non-rectangular images is also referred to as "Abnormal Display". Respective sub-images in such a non-rectangular image may be appropriately moved to form a rectangular image suitable for channel transmission.

In step S104, the stitched image is transmitted. Since only a part of the sub-images are determined as the image to be output in step S102, and in step S103, the stitched image is obtained based on only the sub-images of the determined image to be output, that is, the transmitted stitched image includes only the sub-images determined as the image to be output, while other sub-images are discarded and not used for transmission, so that the size of the stitched image is smaller than the size of the input image.

By executing the above processing steps of the image processing method according to the embodiments of the present disclosure, a part of the sub-images that do not need to be displayed on a display screen for the user to view are discarded, and by appropriately stitching the sub-images determined as the image to be output, the stitched image suitable for channel transmission and having a smaller size than the original input image may be obtained. Therefore, compared to transmitting the original input image, transmitting the stitched image with a smaller size through a channel may save channel resources.

Figure 14:
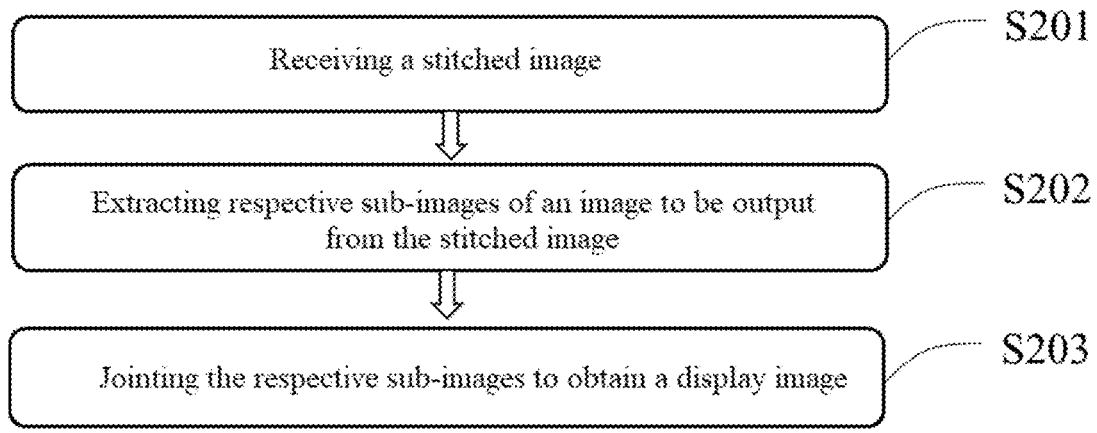
FIG. 14 shows a flowchart of an image jointing method according to the embodiments of the present disclosure.

According to the embodiments of the present disclosure, an image jointing method is also provided. FIG. 14 shows a flowchart of the image jointing method.

First, in step S201, a stitched image is received. The stitched image may be a stitched image obtained according to the image processing method described above. The stitched image is obtained by stitching respective sub-images of an image to be output.

Next, in step S202, the respective sub-images of the image to be output are extracted from the stitched image. Then, in step S203, the respective sub-images are jointed to obtain a display image. According to the embodiments of the present disclosure, jointing the respective sub-images refers to obtaining the display image by an operation inverse to the stitching process of stitching the respective sub-images to obtain the stitched image.

According to the embodiments of the present disclosure, the image jointing method may further comprise: calculating, for the respective sub-images of the image to be output, jointing parameters of the sub-images; and then jointing the respective sub-images based on the jointing parameters of the respective sub-images.

According to the embodiments of the present disclosure, the jointing parameters may include area ratio parameters and offset parameters. The area ratio parameters include width ratios and height ratios of the sub-images relative to the display area of the display apparatus, and the offset parameters include starting positions of the sub-images in the display area.

According to the embodiments of the present disclosure, the jointing the respective sub-images may include, for example, jointing according to a shape of the display area of the display apparatus.

For example, the shape of the display apparatus matches the shape of the image to be output, so that the output image may be projected onto the display screen most effectively. Therefore, when the stitched image reaches the side of the display apparatus, it needs to be restored to the image to be output, in order to be completely displayed on the display screen. Since the stitching process is transforming from the image to be output to the stitched image, and the jointing process is restoring from the stitched image to the image to be output, the jointing the respective sub-images refers to obtaining the display image by an operation inverse to a stitching process of stitching the respective sub-images to obtain the stitched image.

For example, the so-called reverse operation may mean that adjustment of positions of the respective sub-images by the jointing process is opposite to adjustment of the positions of the respective sub-images by the stitching process.

For example, the above steps S101 to S104 may be performed in the renderer, and steps S201 to S203 may be performed in the display apparatus. In particular, said steps S201 to S203 may be performed by a driver integrated circuit (Driver IC) of the display apparatus.

Figure 2:
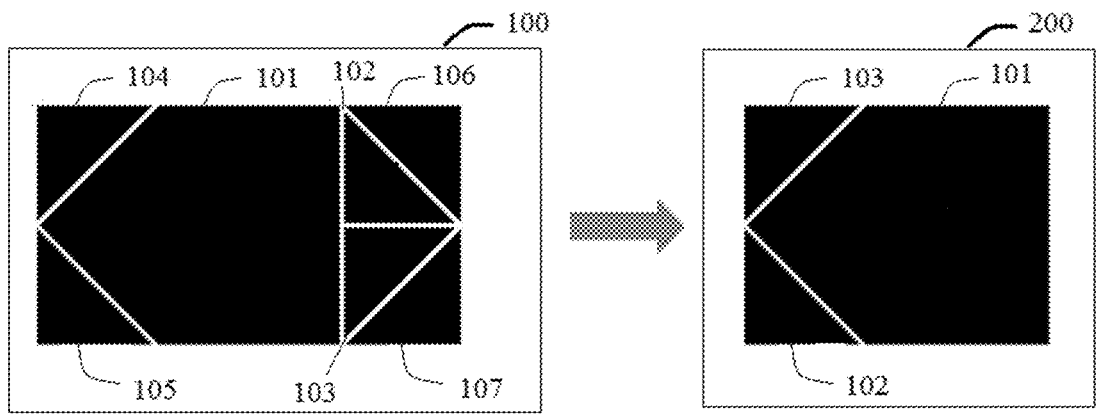
FIG. 2 shows a schematic diagram illustrating a process of area division and stitching of images in the image processing method according to the embodiments of the present disclosure.

To facilitate description of the process of the image processing method and the image jointing method according to the present disclosure, some specific embodiments are provided as follows. As shown in FIG. 2, a schematic diagram of performing pixel area division and stitching of an image to be output to form a stitched image in the image processing method according to the present disclosure is shown.

For example, in FIG. 2, the rectangular image on the left side is the original input image 100, and the size of the input image may be 1920*1080. As in the above step S101, the input image may be divided into seven sub-images according to an area distribution, such as sub-images 101-107 in the image on the left side of FIG. 2. Sub-images labeled 101-103 shown in FIG. 2 are determined as an image to be output, and they are combined into a hexagonal image, while the other four sub-images 104-107 will be discarded images, that is, they will not be transmitted to a display apparatus.

The rectangular image on the right side of FIG. 2 is a stitched image 200 obtained by the stitching process, and the size of the stitched image is 1380*1080. Moreover, by comparing the rectangular images on the left and right, it can be found that the process of stitching the sub-images 101-103 of the image to be output to form the stitched image 200 may be expressed as: translating the sub-image labeled 102 in the left image to the lower left with respect to the sub-image labeled 101, and translating the sub-image labeled 103 in the left image to the upper right with respect to the sub-image labeled 101; combining the translated sub images labeled 102 and 103 with the unmoved sub-image labeled 101, to obtain the rectangular stitched image 200 on the right side as shown in FIG. 2.

In FIG. 2, the size of the stitched image on the right side is only (1380* 1080)/(1920*1080)=71.875% of the size of the rectangular image on the left side, that is, compared to transmitting the rectangular image on the left side, transmitting the stitched image on the right side can save 28.125% of the transmission channel bandwidth.

According to the embodiments of the present disclosure, the process of stitching the image to be output (non-rectangular image) including the sub-images 101-103 to form the stitched image may include a plurality of different movement paths performed on the respective sub-images, and may include a variety of movement manners such as translation and rotation.

In some embodiments, in order to improve execution efficiency of an algorithm and reduce complexity of the algorithm, a sub-image with the largest area among the respective sub-images of the image to be output may be determined firstly, such as the sub-image 101 in FIG. 2, then the sub-image with the largest area may be fixed, and other sub-images of the respective sub-images, such as the sub-images 102 and 103 in FIG. 2, are moved relative to the sub-image with the largest area, to obtain the stitched image.

For example, the sub-image having the largest area among the respective sub-images may include the user's viewing point area.

For example, the stitching process may be implemented by a model. Therefore, for example, a model may be established in advance as needed by using modeling software, and then the model is imported into the renderer as a file for stitching sub-images.

Figure 3:
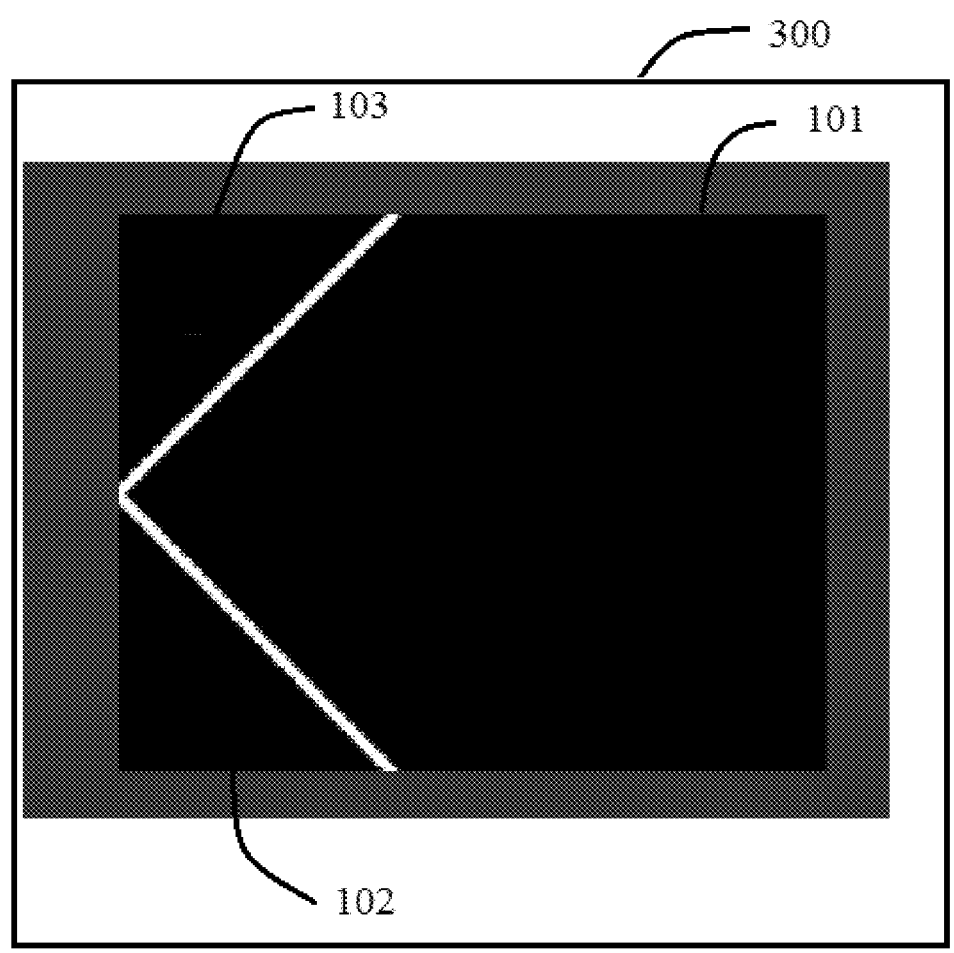
FIG. 3 shows a schematic diagram of establishing a model for completing a stitching process shown in FIG. 2 in the image processing method according to the embodiments of the present disclosure.

FIG. 3 is a schematic diagram 300 illustrating establishing a model for completing the stitching process shown in FIG. 2 in the image processing method according to the embodiments of the present disclosure.

Since an image for display is usually presented on the screen of the display apparatus in the form of a video stream, it is necessary to repeatedly perform operations such as capturing, stitching processing, transmitting, and displaying for each frame of image in the video stream. In some embodiments, a model may be established in advance to complete the area division and stitching process of the sub-images as shown in FIG. 2. In this way, during processing of each frame of image, the image may be stitched in real-time simply by calling the model, saving calculation amount of re-determining a stitching path for each frame of image.

A modeling process needs to provide respective sub-images to be stitched to the modeling software, and to set in advance a size and a shape of a stitched image that is expected to be output. That is, shapes and sizes of the respective sub-image, and relative positional relationships among the respective sub-images are specific, and the size and the shape of the stitched image expected to be output are also specific, so that movement trajectories of the respective sub-images are also determined.

For example, the established model shown in FIG. 3 is used to generate a stitched image of a selected size based on the three sub-images labeled 101-103 in FIG. 2. In the examples of FIGS. 2 and 3, the stitched image of the selected size may be a rectangular image. It should be appreciated that the image of the selected size may also be an image of other shapes, which is not limited in the present disclosure.

After having been established, the model may be imported into the renderer and used directly. The renderer provides the respective sub-images of the image to be output to the model, and acquires the stitched image generated by the model for transmission to the display apparatus.

Figure 4:
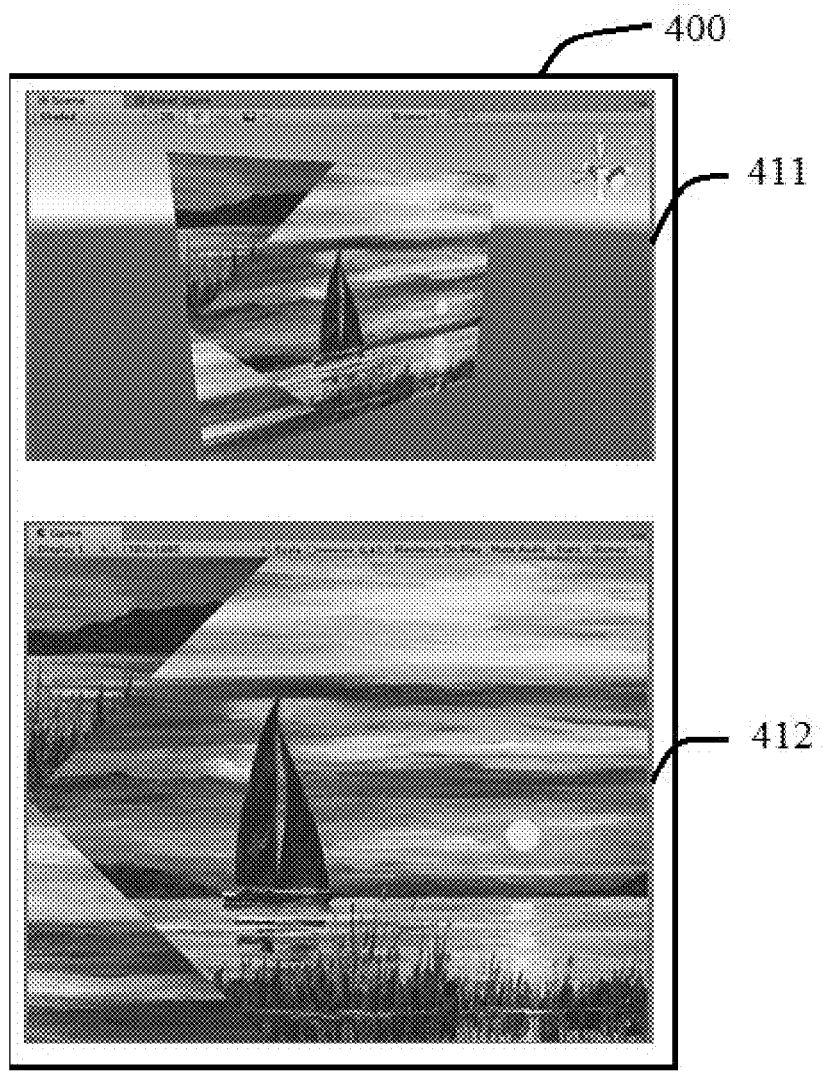
FIG. 4 shows a schematic diagram of the output stitched image shown in FIG. 2 according to the embodiments of the present disclosure.

FIG. 4 is a schematic diagram 400 showing the output stitched image shown in FIG. 2 according to the embodiments of the present disclosure. The top and bottom views shown in FIG. 4 are Scene view 411 and Game view 412 of the stitched image, respectively, that may be viewed in the renderer. The Scene view is a 3D image, and the stitched image may be viewed from different perspectives by adjusting the angle of the virtual camera; and the Game view is a planar image of the 3D image. The stitched image is appropriately adjusted by viewing the Game view, so that the two-dimensional stitched image (rectangular image) may be transmitted in the channel.

As described above, a plurality of sub-images to be stitched need to be provided when establishing the model. For example, the respective sub-images and relative positional relationships of the respective sub-images are provided to the modeling software.

For example, the jointing parameters of the respective sub-images are determined in advance. The jointing parameters have the following two functions: the first function is used to the establishment of the model in order to determine initial relative positions of the respective sub-images, and calculate movement trajectories of the respective sub-images based on the initial relative positions to form a desired stitched image; the second function is that they can be used on the display apparatus side to restore, for example, by the display apparatus, the stitched image received from the channel to a display image with the same shape as the original image to be output.

Determination of the jointing parameters will be described in detail below with reference to FIG. 2. Since the jointing parameters reflect the relative positional relationships among the sub-images of the original image to be output, the jointing parameters may be determined according to the left rectangular image in FIG. 2. In particular, the jointing parameters may include area ratio parameters Scales and offset parameters Offsets. An area where the original input image is located is called the display area (for example, the scene where the original input image is located). The area ratio parameters Scales may include width ratios and height ratios of the sub-images relative to the display area, and the offset parameters may include specific positions of the sub-images in the display area.

For example, after complementing a sub-image to a smallest rectangle, the offset parameter of the sub-image may be determined by offset ratios of the lower-left corner of the smallest rectangle relative to the lower-left corner of the display area in the width direction and the height direction, respectively.

To simplify the calculation, in the embodiments of the present disclosure, an endpoint at the lower-left corner of the display area (i.e., the original input image) is set as a reference point (0,0). It is easy to understand that it is feasible to choose any other position as the reference point.

Taking the left rectangular image in FIG. 2 as an example, for the sub-image labeled 101, its area ratio parameter is Scale=Vector 2 (1380/1920, 1) and its offset parameter is Offset=Vector 2 (0, 0); for the sub-image labeled 102, its area ratio parameter is Scale=Vector 2 (540/1920, 0.5) and its offset parameter is Offset=Vector 2 (1380/1920, 0.5); for the sub-image labeled 103, its area ratio parameter is Scale=Vector 2 (540/1920, 0.5) and its offset parameter is Offset=Vector 2 (1380/1920, 0). Herein, Vector 2 denotes a two-dimensional vector.

For an established model, shapes and sizes of respective sub-images to be stitched and relative positional relationships among them are already determined, and positions of the respective sub-images in the stitched image is also determined. Thus in practice, when the established model is imported and used in the renderer, the renderer may label each sub-image and provide the plurality of sub-images to the model in parallel according to respective labels thereof, and the model may move the respective sub-images to corresponding positions according to their labels, to generate the desired stitched image.

Taking the stitching process shown in FIG. 2 as an example, the three sub-images to be output may be sequentially labeled 101-103, as shown by the rectangular image on the left. Since the model is determined, relative positions of the respective sub-images in the stitched image will also be determined after stitching. In particular, as shown by the rectangular image on the right of FIG. 2, in the stitched image, the sub-image labeled 102 is moved to the lower left of the sub-image labeled 101, and the sub-image labeled 103 is moved to the top left of the sub-image labeled 101. Since the positional relationships of the respective sub-images are determined whether before or after stitching, when the respective sub-images are provided to the established model according to the labels, the model may quickly move the respective sub-images to positions corresponding to labels thereof, to obtain the desired stitched image.

It is easy to appreciate that, since the jointing parameters may reflect the relative positional relationships of the respective sub-images, the operation of labeling the respective sub-images as described above may be completed based on the jointing parameters of the respective sub-images.

Figure 5:
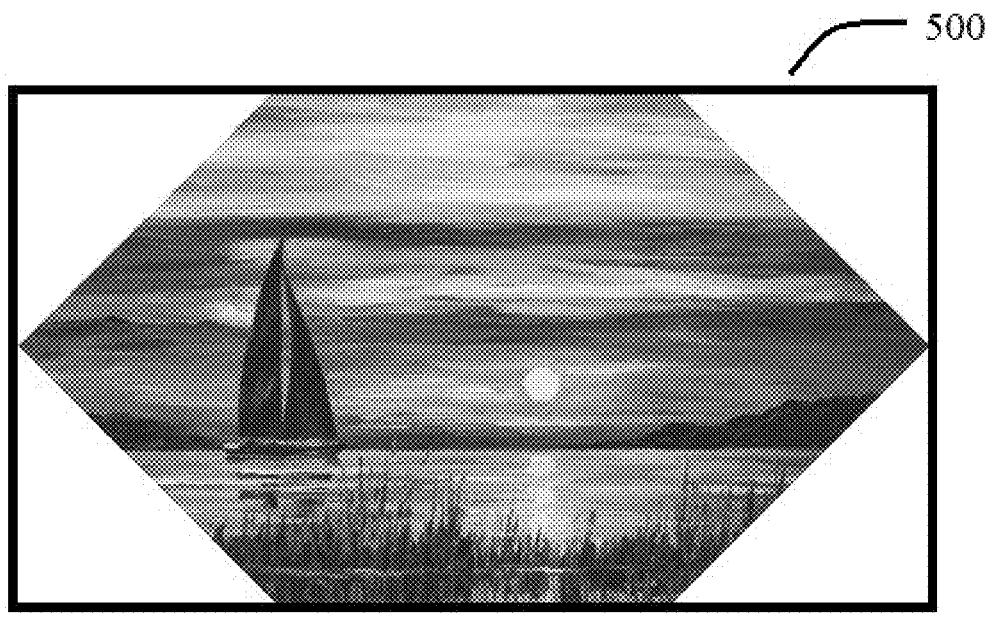
FIG. 5 shows a schematic diagram of an image displayed on a display apparatus according to the embodiments of the present disclosure.

FIG. 5 is a schematic diagram 500 showing a display image displayed on the display apparatus according to the embodiments of the present disclosure. After the renderer outputs the stitched image and transmits the stitched image to the display apparatus side via a channel, the display apparatus receives the stitched image, and the process of the image jointing method according to the present disclosure (that is, restoring the received stitched image to the original image to be output) may be executed by a processor (for example, a driver circuit (Driver IC)) configured in the display apparatus, in order to obtain the display image for display on the display screen. For example, the display image shown in FIG. 5 corresponds to the image to be output shown in FIG. 2. Therefore, the display image is also a hexagon image.

When the operations of the image jointing method (i.e., image restoration) according to the present disclosure is performed by the driving circuit of the display apparatus, since the jointing parameters include the relative positional relationships of the respective sub-images before stitching, the driving circuit may joint (restore) the respective sub-images to the original image to be output based on the jointing parameters of the respective sub-images determined as previously described.

For example, the driving circuit may move the respective sub-images to the positions corresponding to their labels based on the labels of the respective sub-images as described above. Taking FIG. 2 as an example, the original image to be output, that is, the left image in FIG. 2 includes images of the sub-images 101-103, where the sub-image labeled 102 is at the upper right of the sub-image labeled 101, and the sub-image labeled 103 is at the bottom right of the sub-image labeled 101. In this way, images received from a channel may also be quickly restored to the original image to be output.

The shape of the display screen of the display apparatus (for example, the shape of the display area of the display panel) matches the shape of the image to be output. For example, the screen shape of the display apparatus shown in FIG. 5 is a hexagon. Certainly, other shapes may also be adopted according to actual conditions, which is not limited in the present disclosure.

Figure 6:
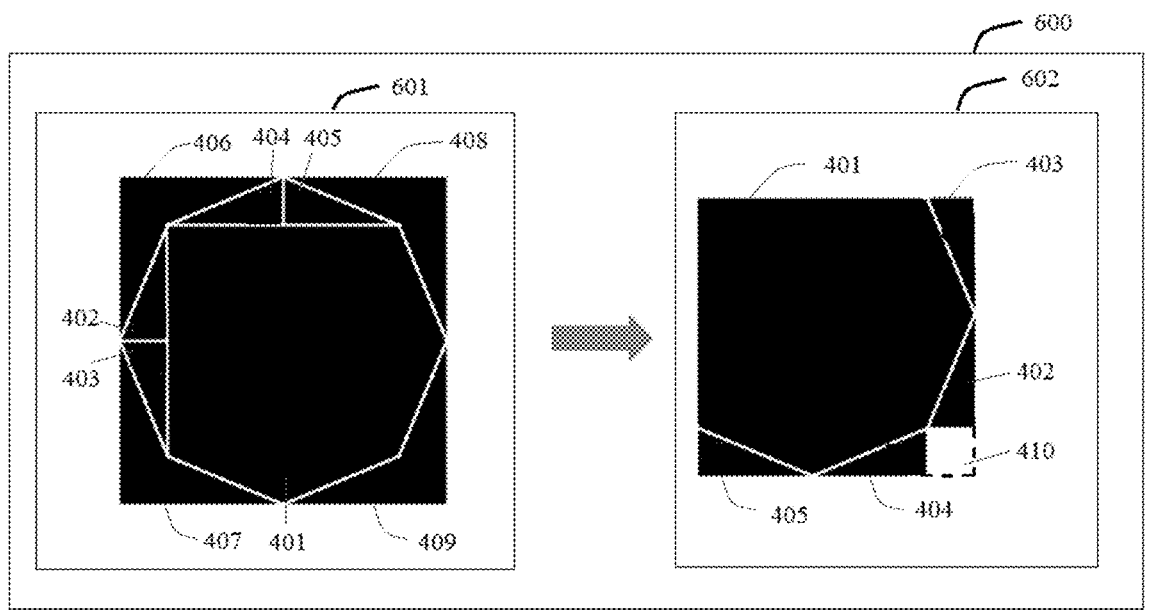
FIG. 6 shows a schematic diagram of an image stitching process according to the embodiments of the present disclosure.

FIG. 6 shows a schematic diagram 600 of another image stitching process according to the embodiments of the present disclosure, wherein the image to be output is an octagonal image.

As shown in FIG. 6, the square image on the left side is the original input image 601, and the size of the input image may be 1000*1000. As in the above step S101, the input image may be divided into nine sub-images 401-409 according to an area distribution, among which sub-images labeled 401-405 shown in FIG. 6 are determined as the image to be output to a display, and they are combined into one octagonal image, while the other four sub-images located at the edges of the square image are images that will not be displayed by the display. The square image on the right side is a stitched image after stitching, and the size of the stitched image is close to 856*856 (a rectangular area is missing). Moreover, by comparing the rectangular images on the left and right sides, the sub-image labeled 401 may be determined as the largest sub-image among the five sub-images to be output. Therefore, the sub-image labeled 401 may be fixed, and other sub-images of the respective sub-images are moved relative to the sub-image with the largest area. For example, the sub-image labeled 402 is translated to the lower right relative to the sub-image labeled 401, the sub-image labeled 403 is translated to the upper right relative to the sub-image labeled 401, the sub-image labeled 404 is translated to the lower right relative to the sub-image labeled 401, and the sub-image labeled 405 is translated to the lower left relative to the sub-image labeled 401, and the translated sub-images labeled 402-405 are combined with the unmoved sub-image labeled 401 to obtain the near-square stitched image 602 shown on the right side of FIG. 6.

In FIG. 6, the size of the approximately square image on the right side is only 73.27% of the size of the square image on the left side, that is, compared to transmitting the square image on the left side, transmitting only the stitched image on the right side may save 26.73% of the transmission channel bandwidth. For example, an arbitrary number of input sub-images cannot necessarily be stitched into a desired rectangular image, and the desired rectangular image has a desired size value. The desired size value may be determined by the display area of the display screen. At this time, a rectangular image closest to the desired size value may be output as the stitched image, and the ratio of the area of the stitched image to the area of the rectangular image with the desired size value is between [0, 1]. For example, it is selectable to obtain the stitched image in such a way that the maximum value within the range [0,1] may be reached.

For example, the respective sub-images input into the model may not be just stitched into the desired rectangular image. For example, as shown by the image 602 on the right side of FIG. 6, the stitched image stitched from the sub-images 401-405, compared to a rectangle, lacks a rectangular area as shown by the area 410. In this case, the renderer may fill the vacant area 410 so as to fill the stitched image into a rectangular image having the desired size value. For example, the renderer may fill the vacant area 410 by using a background color or a gradient color, and the way of filling the vacant area 410 is not limited in the present disclosure.

In some embodiments, for a case of performing the jointing operation by the driving circuit of the display apparatus, it is easy to understand that since the filled vacant area 410 is not finally displayed as the display image on the display area of the display apparatus, the vacant area 410 will be discarded during the jointing process (restoring process) of the driving circuit of the display apparatus, but it needs to be transmitted in the channel Therefore, compared with the case where it is just to stitch into a rectangular image, the bandwidth that can be saved is slightly less.

Figure 7:
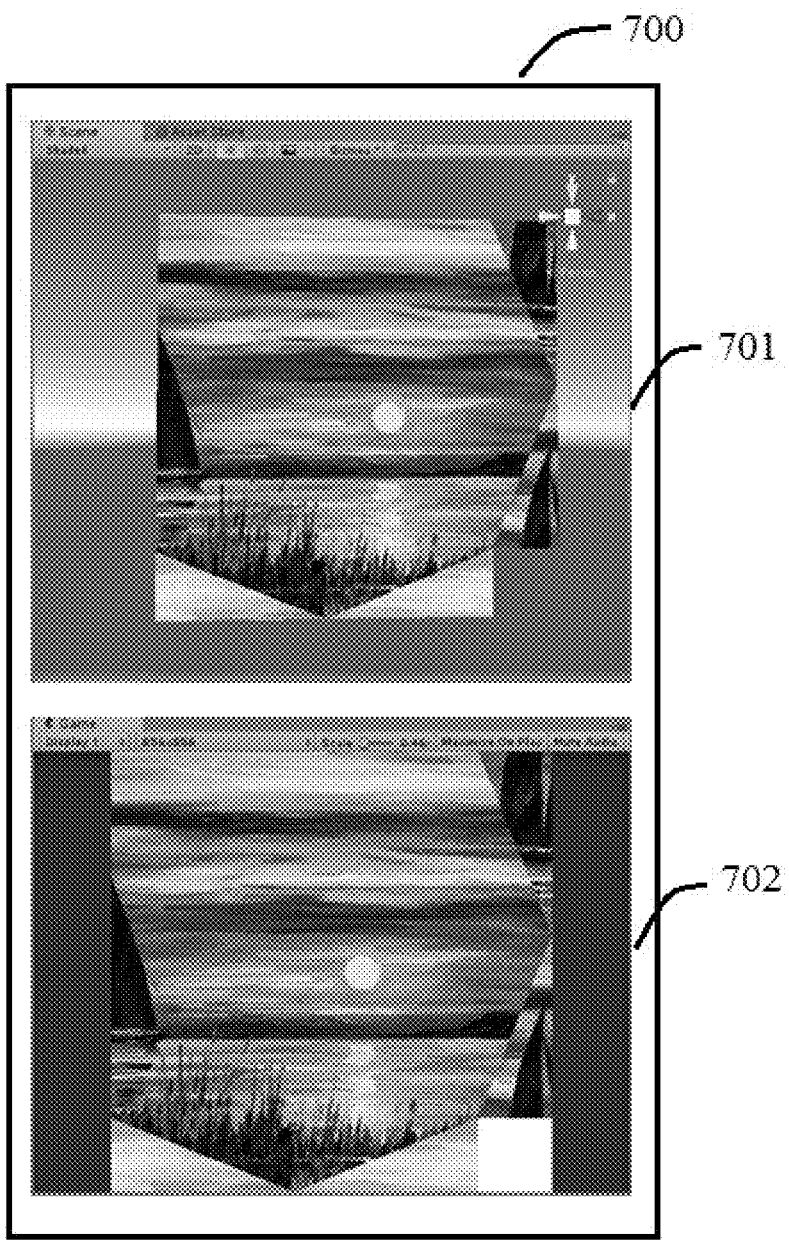
FIG. 7 shows a schematic diagram of a stitched image obtained according to the stitching process shown in FIG. 6.

FIG. 7 is a schematic diagram 700 showing a stitched image obtained according to the stitching process shown in FIG. 6. The upper and lower views shown in FIG. 7 are Scene view 701 and Game view 702 of the stitched image respectively that may be viewed in the renderer. The Scene view is a 3D image, and the stitched image (close to a square image) may be viewed from different perspectives by adjusting the angle of the virtual camera. The Game view is a planar image of the 3D image. The stitching image is appropriately adjusted by viewing the Game view, and the two-dimensional stitched image is filled (for example, with a background color or gradient color, etc.) with respect to the vacant area 410 of the desired rectangular image, and finally the filled rectangular image is transmitted in a transmission channel.

Figure 8:
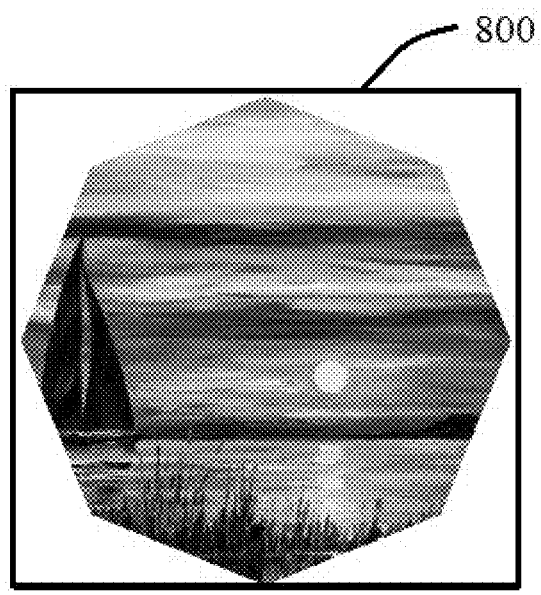
FIG. 8 shows a schematic diagram of an image displayed on a display apparatus according to the embodiments of the present disclosure.

FIG. 8 is a schematic diagram 800 showing a display image according to the embodiments of the present disclosure. The display image shown in FIG. 8 is obtained based on the stitched image 602 shown in FIG. 6. When the renderer outputs the filled stitched image and transmits it to the display apparatus side via a channel, the driving circuit in the display apparatus may restore the received stitched image to the original image to be output (i.e., an octagon image) for display in the display area of the display screen. That is, the display apparatus first extracts the respective sub-images 401-405 of the image to be output from the stitched image 602, and then joints the respective sub-images to obtain the display image. Certainly, as described above, during the image restoration process on the display apparatus side, the image content of the filled vacant area 410 needs to be discarded.

According to the embodiments of the present disclosure, the image to be output may be determined based on the shape of the display area. For example, the shape of the display area of the display screen, such as a square or a rectangle, and the size of the shape may be obtained firstly. For example, when the shape of the display area is obtained as a rectangle, the input image 100 may be divided into a plurality of sub-images 101-107 as shown by the image on the left side of FIG. 2. For example, when the shape of the display area is obtained as a square, the input image 601 may be divided into a plurality of sub-images 401-409 as shown by the image on the left side of FIG. 6.

Figure 15:
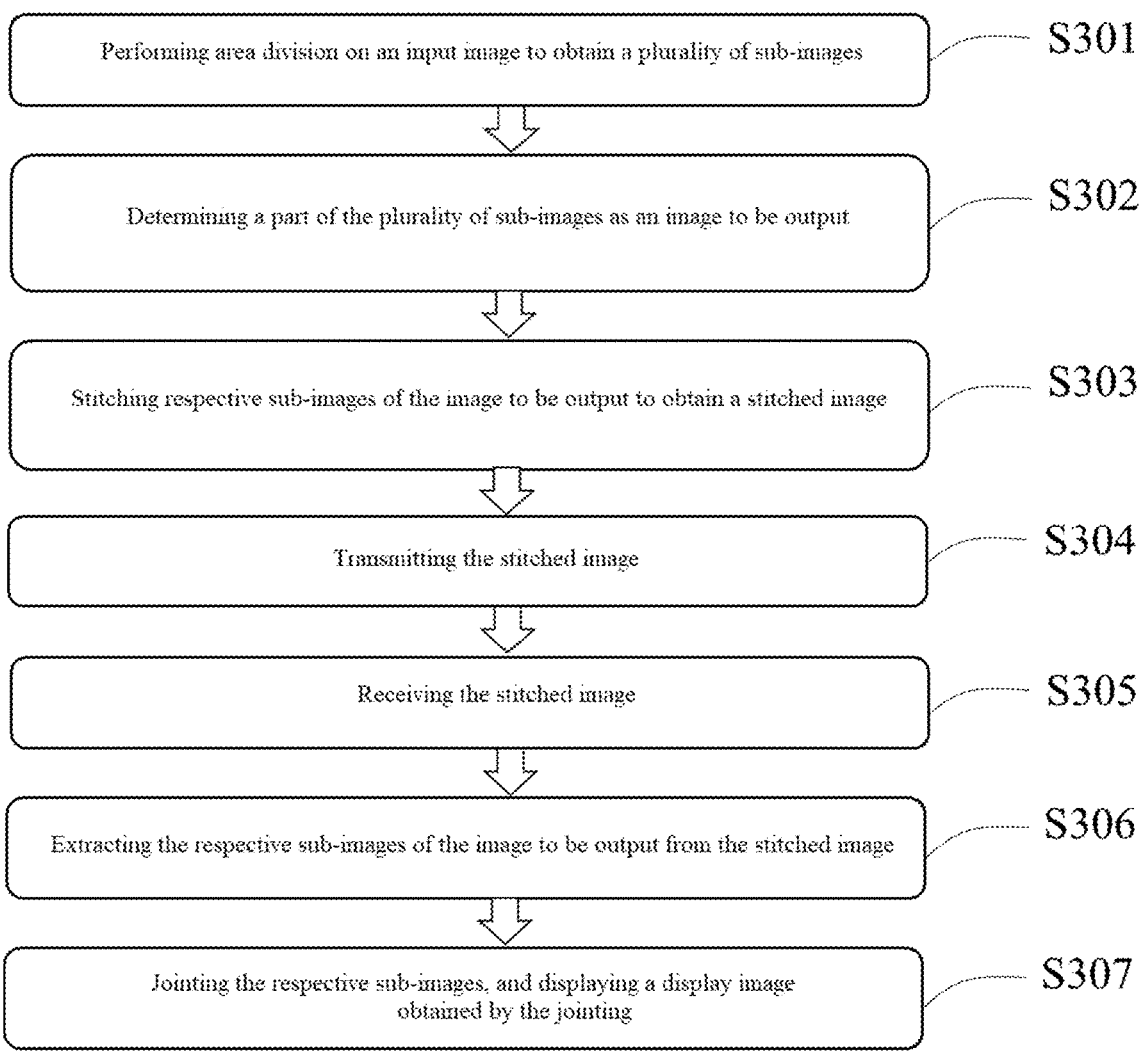
FIG. 15 shows a flowchart of an image display method according to the embodiments of the present disclosure.

FIG. 15 shows a flowchart of an image display method according to the embodiments of the present disclosure.

First, in step S301, area division is performed on an input image to obtain a plurality of sub-images. According to an embodiment of the present disclosure, the division of the sub-images may be based on a shape of a display area of a display apparatus. According to another embodiment of the present disclosure, the sub-images may also be divided based on acquired viewing point data of a user in the display area.

Next, in step S302, a part of the plurality of sub-images are determined as an image to be output. Sub-images that are not determined as the image to be output will be discarded as discarded images, that is, only the sub-images of the image to be output need to be transmitted, while the discarded images do not need to be transmitted.

Next, in step S303, the respective sub-images of the image to be output are stitched to obtain a stitched image. In step 304, the stitched image is transmitted, for example, the stitched image may be transmitted to the display apparatus for display.

The processing of the above steps S301 to S304 is similar to the image processing method shown in FIG. 1, which will not be repeatedly described herein.

Next, as shown in FIG. 15, in step S305, the stitched image is received. The stitched image may be a stitched image obtained according to the step S303 as described above. The stitched image is obtained by stitching the respective sub-images of the image to be output.

Next, in step S306, the respective sub-images of the image to be output are extracted from the stitched image. Then, in step S307, the respective sub-images are jointed, and a display image obtained by the jointing is displayed, for example, on the display screen. According to the embodiment of the present disclosure, the jointing the respective sub-images refers to obtaining the display image by an operation inverse to the stitching process of stitching the respective sub-images to obtain the stitched image.

The processing of the above steps S305 to S307 is similar to the image jointing method shown in FIG. 14, which will not be repeatedly described herein.

Figure 9A:
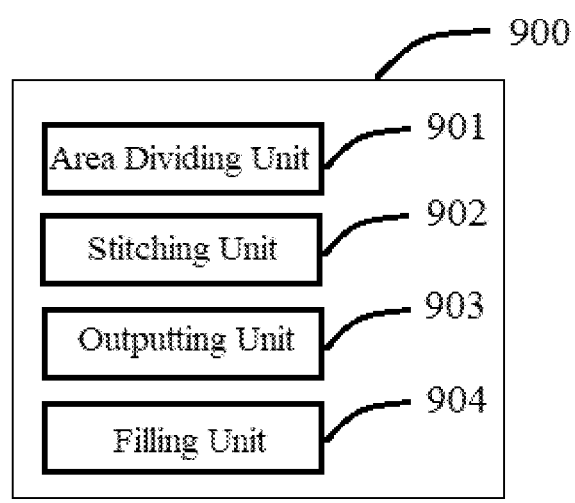
FIG. 9A shows a schematic diagram of an image processing device according to the embodiments of the present disclosure.

FIG. 9A is a schematic diagram illustrating an image processing device according to the embodiments of the present disclosure. The image processing device 900 shown in FIG. 9A may comprise an area dividing unit 901, a stitching unit 902, and an outputting unit 903.

In particular, the area dividing unit 901 is configured to perform area division on an input image to obtain a plurality of sub-images. A part of the divided plurality of sub-images are taken as the image to be output, while sub-images other than the image to be output in the input image do not need to be transmitted. For example, the shape of the image to be output may be a non-rectangular shape such as a hexagon, an octagon, and the like, which is not limited in the present disclosure. In addition, considering the focusing characteristics of human eyes, a plurality of sub-images in the central area of the input image may be taken as the image to be output, while sub-images in the edge area of the input image do not need to be transmitted, that is, the sub-images in the edge area are discarded during transmission.

The stitching unit 902 is configured to stitch the respective sub-images of the image to be output to obtain a stitched image. As described above, the image to be output may be a non-rectangular image, so the respective sub-images in the non-rectangular image need to be moved appropriately to stitch them into a rectangular image suitable for channel transmission.

The outputting unit 903 is configured to output the stitched image. Since at least one of the plurality of sub-images is discarded after the area division of the input image, the size of the stitched image is smaller than the size of the input image.

The image processing device 900 of the embodiment of the present disclosure may discard a part of the sub-images that do not need to be displayed on the display screen for viewing by the user, and appropriately stitch the sub-images to be output to obtain the stitched image suitable for channel transmission and having a size smaller than the original input image. Therefore, compared to transmitting the original input image, transmitting the stitched image with a smaller size via a channel can save channel resources.

In some embodiments, the stitched image may be a rectangular image. Since an image to be transmitted on the channel by the image processing device 900 needs to be a rectangular image, it is generally required that the image stitched by the stitching unit should also be a rectangular image. The size of the rectangular image may be set in advance, and preferably, a size that is most convenient to form a rectangle may also be set according to shapes and sizes of the respective sub-images of the image to be output.

In some embodiments, the image processing device 900 may further comprise: a filling unit 904 configured to fill the stitched image relative to a vacant area of a rectangular rectangle with a set size when the stitched image is a non-rectangular image, to make it a rectangular image with the set size. At some time, no matter how the respective sub-images of the image to be output are moved, they cannot be just stitched into a rectangular image of a selected size, resulting in a stitched image having a vacant area relative to the rectangular image with the selected size, then the filling unit 904 is required to fill the vacant area by using, for example, a background color or a gradient color to ensure that the image transmitted in the channel is a rectangular image.

In some embodiments, stitching the respective sub-images of the image to be output may include: determining a sub-image with the largest area in the respective sub-images, and moving the other sub-images of the respective sub-images relative to the sub-image with the largest area. For example, the sub-image with the largest area may be fixed and only other sub-images are moved. By fixing the sub-image with the largest area and moving the other sub-images, speed of executing the image stitching program may be increased. Moreover, in order to further reduce complexity of the algorithm, the other sub-images may be translated only, without more complicated movements such as rotation and flipping. It should be understood that the present disclosure selects a translational movement mode as an example of the present disclosure simply from the perspective of optimizing the algorithm, while in reality, any movement mode is advisable, which is not limited in the present disclosure.

Figure 9B:
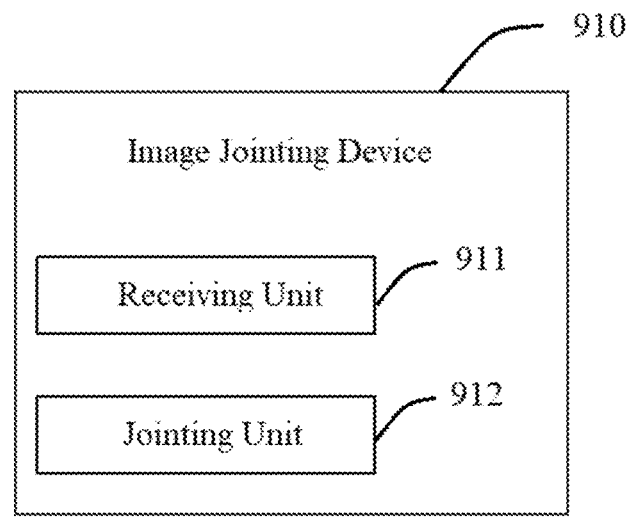
FIG. 9B shows a schematic diagram of an image jointing device according to the embodiments of the present disclosure.

FIG. 9B shows a schematic diagram of an image jointing device according to the embodiments of the present disclosure. As shown in FIG. 9B, the image jointing device 910 may comprise a receiving unit 911 and a jointing unit 912.

The image jointing device 910 is configured to receive a stitched image obtained according to the image processing method described above, such as the stitched image 200, the stitched image 602, and the like. The jointing unit 912 is configured to extract respective sub-images of an image to be output from the stitched image, and joint the respective sub-images to obtain a display image, where the jointing the respective sub-images refers to obtaining the display image by an operation inverse to a stitching process of stitching the respective sub-images to obtain the stitched image.

Figure 10:
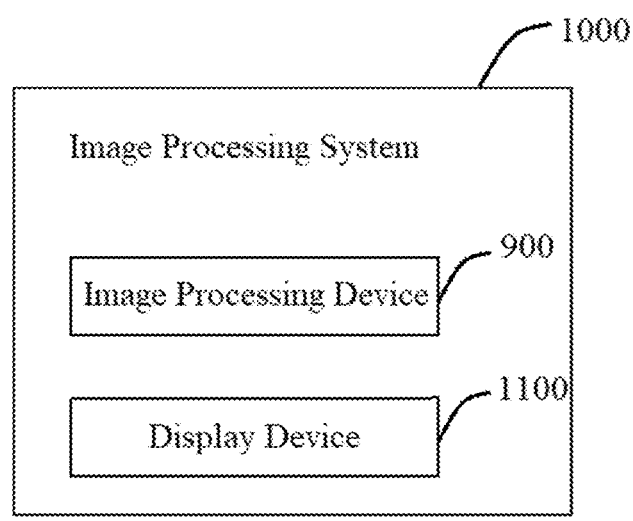
FIG. 10 shows a schematic diagram of an image processing system according to the embodiments of the present disclosure.

FIG. 10 is a schematic diagram illustrating an image processing system according to the embodiments of the present disclosure. As shown in FIG. 10, the image processing system 1000 may comprise: the image processing device 900 described above; and a display device 1100. The display device 1100 is used to receive an image output from the image processing device 900 via a channel, and is used to display the image.

Figure 11:
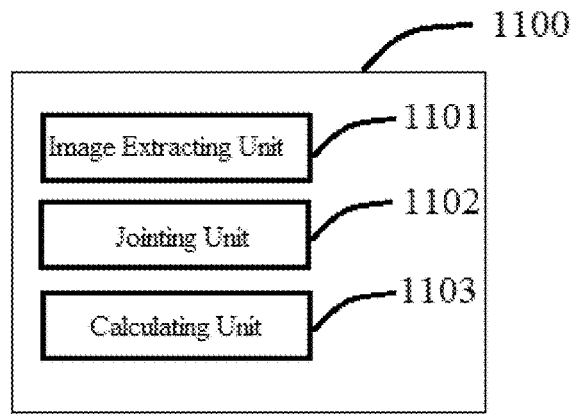
FIG. 11 shows a schematic diagram of a display device included in an image processing system according to the embodiments of the present disclosure.

FIG. 11 is a schematic diagram illustrating the display device 1100 comprised in the image processing system according to the embodiments of the present disclosure. As shown in FIG. 11, the display device 1100 may include an image extracting unit 1101 and a jointing unit 1102. The image extracting unit 1101 may be configured to extract respective sub-images of an image to be output from a stitched image; and the jointing unit 1102 may be configured to joint the respective sub-images to obtain a display image.

Generally, the shape of the display area in the display device matches the shape of the image to be output, so that the output image may be projected onto the display screen most effectively. Therefore, when reaching the display device side, the stitched image needs to be restored to the original image to be output, in order to be displayed on the display screen optimally. Since the stitching process is transforming from the image to be output to the stitched image, and the jointing process is restoring from the stitched image to the image to be output, the jointing the respective sub-images may be a reverse operation of stitching the respective sub-images of the image to be output.

In some embodiments, the jointing the respective sub-images may be jointing based on jointing parameters of the respective sub-images, and the display device 1100 may further comprise a calculating unit 1103 configured to calculate the jointing parameters of the respective sub-image for the respective sub-images of the image to be output.

The jointing parameters may reflect relative positional relationships among the respective sub-images of the original image to be output. In particular, the jointing parameters may include area ratio parameters Scales and offset parameters Offsets. If an area where the original input image is located is called the display area, the area ratio parameters Scales may include width ratios and height ratios of the sub-images relative to the display area; and the offset parameters may include specific positions of the sub-images in the display area, for example, after complementing a sub-image to a smallest rectangle, the offset parameter of the sub-image may be determined by offset ratios of the lower-left corner of the smallest rectangle relative to the lower-left corner of the display area in the width direction and the height direction, respectively. To simplify the calculation, in the embodiments of the present disclosure, an endpoint at the lower-left corner of the display area (i.e., the original input image) is set as a reference point. It should be appreciated that other position may be selected as the reference point, which is not limited in the present disclosure.

As previously described, since the jointing parameters may reflect the relative positional relationships among the respective sub-images of the original image to be output, the stitched image may be restored to the original image to be output according to the calculated jointing parameters.

In some embodiments, the shape of the display area of the display device 1100 may be non-rectangular.

The embodiments of the present disclosure also provide a computer-readable storage medium on which a computer program is stored, and when the computer program is configured to be executed by a processor, one or more steps of the image processing method according to the embodiments of the present disclosure may be implemented.

Figure 12:
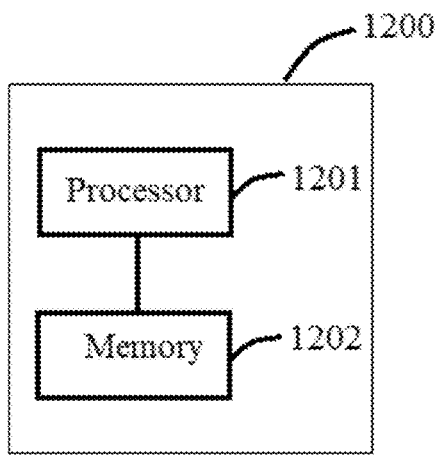
FIG. 12 shows a schematic diagram of an image processing apparatus according to the embodiments of the present disclosure.

As shown in FIG. 12, the embodiments of the present disclosure further provide an image processing apparatus 1200 that comprises one or more processors 1201 configured to execute computer instructions to perform one or more steps of the image processing method in any one of the foregoing embodiments, or one or more steps of the image jointing method described above.

Optionally, the image processing apparatus 1200 further comprises a memory 1202 connected to the processor 1201 and configured to store the computer instructions.

The memory 1202 may be implemented by any type of volatile or nonvolatile storage device or a combination thereof, such as a Static Random Access Memory (SRAM), an Electrically Erasable Programmable Read only Memory (EEPROM), an Erasable Programmable Read Only Memory (EPROM), a Programmable Read Only Memory (PROM), a Read Only Memory (ROM), a Magnetic Memory, a Flash Memory, a Disk or Optical Disk.

The processor 1201 may be a logic operation device with data processing capability and/or program execution capability, such as a Central Processing Unit (CPU), a Field Programmable Gate Array (FPGA), a Microcontroller Unit (MCU), a Digital Signal Processor (DSP), an Application Specific Integrated Circuit (ASIC), a Graphics Processing Unit (GPU), and the like. One or more processors may be configured to simultaneously perform the above-mentioned image processing method in a parallel computing processor group, or may be configured to perform a part of the steps in the above-mentioned image processing method with a part of the processors, and perform another part of the steps in the above-mentioned image processing method with another part of the processors.

Computer instructions include one or more operations of the processor defined by an instruction set architecture corresponding to the processor. These computer instructions may be logically incorporated and embodied by one or more computer programs.

The image processing apparatus 1200 may also be connected with various input devices (such as user interfaces, keyboards, etc.), various output devices (such as speakers, network cards, etc.), and display devices to realize interaction between the image processing apparatus and other products or users, which will not be repeatedly described herein.

The connection may be a network connection, such as a wireless network, a wired network, and/or any combination of a wireless network and a wired network. The network may include a local area network, the Internet, a telecommunications network, the Internet of Things based on the Internet and/or a telecommunications network, and/or any combination of the above networks. A wired network may use, for example, twisted pairs, coaxial cables, fiber optic transmission, and the like for communication, and a wireless network may use, for example, a 3G/4G/5G mobile communication network, Bluetooth, Zigbee, Wi-Fi, and the like for communication.

Figure 13:
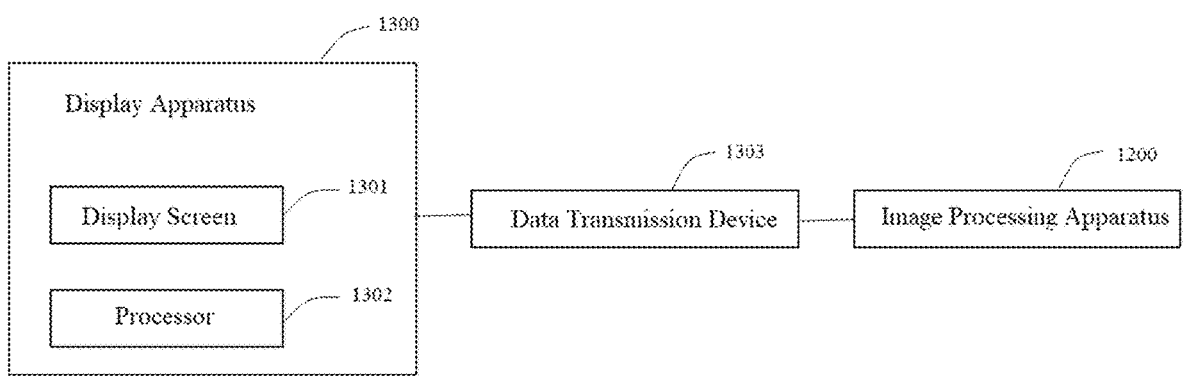
FIG. 13 shows a schematic diagram of a display apparatus according to the embodiments of the present disclosure.

As shown in FIG. 13, the embodiments of the present disclosure also disclose a display apparatus 1300. The display apparatus 1300 may comprise a display screen 1301 and at least one processor 1302. The at least one processor 1302 may be configured to receive a stitched image obtained by the image processing method as described above, and may further be configured to perform the image jointing method described above to obtain a display image. The display screen 1301 may be configured to display the display image.

According to the embodiments of the present disclosure, the display apparatus 1300 may also be connected to the image processing apparatus 1200 via a data transmission device 1303. The image processing apparatus 1200 comprises at least one processor configured to perform the image processing method described above to obtain the stitched image, and to perform the image jointing method described above to obtain the display image. According to the embodiments of the present disclosure, the display apparatus 1300 may receive the stitched image output by the image processing apparatus 1200 via the data transmission device 1303.

The at least one processor 1302 in the display apparatus 1300 may extract respective sub-images of an image to be output from the received stitched image, and joint the respective sub-images to obtain the display image.

The data transmission device 1303 is coupled to a driving circuit of the display apparatus 1300. For example, the data transmission device is connected to an interface (such as VGA, DVI, HDMI, DP, etc.) of the display screen.

For example, the data transmission device 1303 may be a display connection cable corresponding to an interface of the display screen.

For example, the data transmission device 1303 may be a display signal transceiving device based on wireless implementation, for example, a wireless display transceiving device capable of performing display functions such as Air Play, DLNA, Miracast, WiDi, Chromecast, and the like.

For example, the display apparatus 1300 may further comprise one or more sensors configured to track and determine the user's viewing point data within the display area of the display apparatus 1300. The at least one processor 1302 of the display apparatus 1300 is further configured to transmit the viewing point data to the image processing apparatus 1200 via the data transmission device 1303.

According to the embodiments of the present disclosure, the at least one processor 1302 of the display apparatus 1300 is further configured to acquire a shape of the display area of the display apparatus 1300 and transmit the shape to the image processing apparatus 1200 via the data transmission device 1303.

According to the embodiments of the present disclosure, the at least one processor of the image processing apparatus 1200 may be integrated in the driving circuit of the display apparatus 1300 to perform the image jointing method as described above.

For example, the shape of the display area of the display apparatus 1300 includes a non-rectangular shape, such as a triangle, a hexagon, an octagon, and the like.

Although exemplary embodiments have been described herein with reference to the accompanying drawings, it should be understood that the above exemplary embodiments are merely exemplary and are not intended to limit the scope of the present disclosure thereto. A person of ordinary skill in the art can make various changes and modifications therein without departing from the scope and spirit of the present disclosure. All such changes and modifications are intended to be included within the scope of the present disclosure as claimed by the following claims.

What is claimed is:

1. An image processing method, comprising:
   performing area division, according to a shape of a display area of a display apparatus, on an input image to obtain a plurality of sub-images, wherein the shape of the display area of the display apparatus is a non-rectangular shape;
   determining a part of the plurality of sub-images as an image to be output, and wherein at least one of the plurality of sub-images is discarded;
   stitching respective sub-images of the image to be output to obtain a stitched image, wherein the stitched image is rectangular; and
   transmitting the stitched image, wherein the stitched image is smaller than the input image,
   wherein in a case where the display area of the display apparatus is hexagon, the input image is divided into seven sub-images, wherein three sub-images among the seven sub-images are determined as the image to be output, the other sub-images among the seven sub-images are discarded, and the three sub-images correspond to a hexagon region in the input image and are stitched into the stitched image in rectangular.

2. The method of claim 1, wherein the method further comprises:
   filling vacant areas of the stitched image to form a rectangular image.

3. The method of claim 2, wherein the stitching respective sub-images of the image to be output comprises:
   determining a sub-image with the largest area among the respective sub-images, and moving other sub-images among the respective sub-images relative to the sub-image with the largest area.

4. An image display method, comprising:
   performing area division, according to a shape of a display area of a display apparatus, on an input image to obtain a plurality of sub-images, wherein the shape of the display area of the display apparatus is a non-rectangular shape;
   determining a part of the plurality of sub-images as an image to be output, and wherein at least one of the plurality of sub-images is discarded;
   stitching respective sub-images of the image to be output to obtain a stitched image, wherein the stitched image is rectangular;
   transmitting the stitched image, wherein the stitched image is smaller than the input image;
   receiving the stitched image;
   extracting the respective sub-images of the image to be output from the stitched image; and
   jointing the respective sub-images, and displaying a display image obtained by the jointing, wherein the jointing the respective sub-images comprises jointing according to the shape of the display area of the display apparatus,
   wherein the jointing the respective sub-images refers to obtaining the display image by an operation inverse to a stitching process of stitching the respective sub-images to obtain the stitched image,
   wherein in a case where the display area of the display apparatus is hexagon, the input image is divided into seven sub-images, wherein three sub-images among the seven sub-images are determined as the image to be output, the other sub-images among the seven sub-images are discarded, and the three sub-images correspond to a hexagon region in the input image and are stitched into the stitched image in rectangular.

5. The method of claim 4, further comprising:
   calculating, for the respective sub-images of the image to be output, jointing parameters of the sub-images;

jointing the respective sub-images based on the jointing parameters of the respective sub-images.

6. The method of claim 4, wherein the jointing parameters include area ratio parameters and offset parameters,
the area ratio parameters include width ratios and height ratios of the sub-images relative to a display area of a display apparatus, and
the offset parameters include starting positions of the sub-images in the display area.

7. An image processing apparatus, comprising:
one or more processors, and
one or more memories, wherein
the processors are configured to execute computer instructions to perform the image processing method of claim 1.

8. An image processing apparatus, comprising:
one or more processors, and
one or more memories, wherein
the processors are configured to execute computer instructions to perform the image display method of claim 4.

9. A display apparatus comprising a display screen and at least one processor, wherein
the at least one processor is configured to
receive a stitched image obtained by an image processing method, wherein the image processing method comprises:
performing area division, according to a shape of a display area of a display apparatus, on an input image to obtain a plurality of sub-images, wherein the shape of the display area of the display apparatus is a non-rectangular shape;
determining a part of the plurality of sub-images as an image to be output, and wherein at least one of the plurality of sub-images is discarded;
stitching respective sub-images of the image to be output to obtain a stitched image, wherein the stitched image is rectangular; and
transmitting the stitched image, wherein the stitched image is smaller than the input image;
extracting the respective sub-images of the image to be output from the stitched image; and
jointing the respective sub-images, and displaying a display image obtained by the jointing, wherein the jointing the respective sub-images comprises jointing according to the shape of the display area of the display apparatus, wherein the jointing the respective sub-images refers to obtaining the display image by an operation inverse to a stitching process of stitching the respective sub-images to obtain the stitched image; and
the display screen being configured to display the display image,
wherein in a case where the display area of the display apparatus is hexagon, the input image is divided into seven sub-images, wherein three sub-images among the seven sub-images are determined as the image to be output, the other sub-images among the seven sub-images are discarded, and the three sub-images correspond to a hexagon region in the input image and are stitched into the stitched image in rectangular.

10. The display apparatus of claim 9, further comprising one or more sensors configured to track and determine a user's viewing point data within the display area of the display apparatus, the at least one processor of the display apparatus being further configured to transmit the viewing point data to an image processing apparatus, wherein the image processing apparatus comprises one or more processors, and one or more memories, wherein the processors are configured to execute computer instructions to perform the image processing method.

11. The display apparatus of claim 9, the at least one processor of the display apparatus being further configured to obtain the shape of the display area of the display apparatus, and transmit the shape to an image processing apparatus, wherein the image processing apparatus comprises one or more processors, and one or more memories, wherein the processors are configured to execute computer instructions to perform the image processing method.

12. A computer-readable storage medium configured to store computer instructions that, when executed by a processor, perform the image processing method of claim 1.

13. A computer-readable storage medium configured to store computer instructions that, when executed by a processor, perform the image display method of claim 10.

* * * * *

UNITED STATES PATENT AND TRADEMARK OFFICE
CERTIFICATE OF CORRECTION

| | | |
|---|---|---|
| PATENT NO. | : 11,783,445 B2 | Page 1 of 1 |
| APPLICATION NO. | : 16/641537 | |
| DATED | : October 10, 2023 | |
| INVENTOR(S) | : Wang et al. | |

It is certified that error appears in the above-identified patent and that said Letters Patent is hereby corrected as shown below:

In the Claims

On Column 20, Line 40 (Claim 13), please change:
"perform the image display method of claim 10."
To correctly read:
--perform the image display method of claim 4.--

Signed and Sealed this
Sixteenth Day of July, 2024

*Katherine Kelly Vidal*

Katherine Kelly Vidal
*Director of the United States Patent and Trademark Office*